United States Patent [19]

Martin et al.

[11] Patent Number: 5,607,655

[45] Date of Patent: Mar. 4, 1997

[54] OLEFIN POLYMERIZATION CATALYST AND PRECURSOR THEREFOR

[75] Inventors: Joel L. Martin, Bartlesville; Gil R. Hawley, Dewey, both of Okla.

[73] Assignee: Phillips Petroleum Company, Bartlesville, Okla.

[21] Appl. No.: 400,295

[22] Filed: Mar. 6, 1995

Related U.S. Application Data

[63] Continuation of Ser. No. 899,394, Jun. 16, 1992, abandoned.

[51] Int. Cl.$^6$ .................. C01F 5/30; C08F 4/654
[52] U.S. Cl. ................ 423/498; 423/497; 23/304; 502/107; 502/111; 502/115; 502/116; 502/125; 526/124.7; 526/124.8; 526/124.9; 526/125.3; 526/125.4
[58] Field of Search .................. 502/104, 107, 502/111, 117, 125, 127, 128, 134, 172, 226; 423/497, 498; 23/304; 526/124.7, 124.8, 124.9, 125.3, 125.4

[56] References Cited

U.S. PATENT DOCUMENTS

| | | | |
|---|---|---|---|
| 4,315,088 | 2/1982 | Kitagawa et al. | 526/125 |
| 4,325,837 | 4/1982 | Capshew et al. | 252/429 B |
| 4,394,291 | 7/1983 | Hawley | 252/429 B |
| 4,456,695 | 6/1984 | Nimura et al. | 502/104 |
| 4,537,870 | 8/1985 | Hawley | 502/111 |
| 4,544,716 | 10/1985 | Hawley | 526/119 |
| 4,742,139 | 5/1988 | Kioka et al. | 526/125 |
| 5,024,982 | 6/1991 | Hawley et al. | 502/110 |
| 5,091,353 | 2/1992 | Kioka et al. | 502/111 |
| 5,212,133 | 5/1993 | Duranel et al. | 502/134 |

FOREIGN PATENT DOCUMENTS 61-24402  6/1986  Japan.

*Primary Examiner*—Romulo H. Delmendo
*Attorney, Agent, or Firm*—Edward L. Bowman

[57] ABSTRACT

A generally dipyramidal-shaped catalyst precursor is prepared by dissolving magnesium dichloride and a suitable alcohol in a suitable solvent and then cooling to obtain a precipitate of the desired shape. The use of the precursor to prepare catalysts and the use of the catalysts to prepare polymers is also disclosed.

5 Claims, No Drawings

OLEFIN POLYMERIZATION CATALYST AND PRECURSOR THEREFOR

This application is a File Wrapper Continuation of application Ser. No. 07/899,394, filed Jun. 16, 1992, now abandoned.

This invention relates to olefin polymerization. In another aspect, this invention relates to a catalyst useful for the polymerization of olefins. And still another aspect the present invention relates to the formation of magnesium-containing particulate catalyst precursors.

BACKGROUND OF THE INVENTION

The polymerization of alpha-olefins and mixtures thereof at low pressures is known to be promoted by coordination catalysts prepared from mixtures of compounds of (1) transition elements, and (b) organometallic compounds of elements of Groups IA to IIIA of the Periodic Table. Such polymerizations can be carried out in suspension, in solution, in the gas phase, and the like.

Because of favorable process economics, especially with low molecular weight olefins such as ethylene and propylene, it is frequently desirable to carry out olefin polymerization or copolymerization reactions in an inert diluent at a temperature at which the resulting polymer or copolymer does not go into solution; and where the polymer product is recovered without removing the polymerization catalyst. Thus, elaborate steps to remove catalyst from the polymer product are avoided. In order for this more economical method of polymer manufacture to be practical, the polymerization catalyst employed must be capable of producing polymer in high productivities in order to maintain the residual catalyst level in the final polymer at a very low level. Thus, the activity of an olefin polymerization catalyst is one important factor in the continuous search for catalysts useful for the polymerization of alpha-olefins. It is also desirable that the process used in forming such catalysts allow for ease of preparation and ready control over the properties of the final catalyst formed.

Another important aspect of a polymerization catalyst and the polymerization process employing same is the properties of the polymer particles produced. It is desirable to produce polymer particles which are characterized by strength, uniformity of size, and a relatively low level of fine particulate matter. Although polymer fluff having relatively high percentages of polymer fines can be handled with plant modifications, the production of polymers in high productivity with low level of fines content is highly desirable so as to avoid the need for such plant modifications. Especially desirable are polymer particles having a high bulk density and relatively uniform shape as well as size.

In an attempt to control catalyst fines and thus polymer fines in the past, various techniques have been applied. One example involves spray drying to obtain catalyst precursors of particular dimensions. Another technique has involved the prepolymerization of particulate catalyst. Still another technique has involved the employment of only catalyst particles having certain dimensions as separated by sieving.

One object of the present invention is to provide a method for providing a desirably shaped magnesium-containing catalyst precursor.

Another object of the present invention is to provide desirably shaped magnesium-containing olefin polymerization catalysts.

Still another object of the present invention is to provide a process for the polymerization of alpha-olefins which gives both desirable yields and polymer particles of a desirable size.

Still another object of the present invention is to provide olefin polymerization catalysts which have good activity and stereospecificity as well as desirable particle shape.

These and other aspects, objects, and advantages of the invention will become apparent to those skilled in the art from the following disclosure.

SUMMARY OF THE INVENTION

In accordance with the present invention, there is provided a process for producing generally dipyramidal-shaped catalyst precursor particles which can be used to produce similarly shaped olefin polymerization catalysts. The process involves contacting components consisting essentially of magnesium dichloride and a suitable alcohol in a suitable liquid solvent to obtain a solution and then cooling the solution to result in the precipitation of the generally dipyramidal-shaped particles.

In accordance with yet another aspect of the present invention, the generally dipyramidal-shaped magnesium-containing catalyst precursors are contacted with a suitable transition metal compound selected from Groups IVB and VB to yield generally dipyramidal-shaped particulate catalysts.

In accordance with still another aspect of the present invention, there is provided a process for the polymerization of alpha-olefins comprising contacting an alpha-olefin under suitable reaction conditions with a generally dipyramidal-shaped transition metal-containing catalyst prepared from the inventive generally dipyramidal-shaped magnesium-containing catalyst precursor.

DETAILED DESCRIPTION OF THE INVENTION

The term "generally dipyramidal" is used herein to refer to particles shaped somewhat like a football. Typically these particles are elongated with generally pointed ends. The length is generally no more than about four times the width of the largest dimension transverse to the axis of the length of the particle. The particles have a substantial dimension in all three axes and thus can be distinguished from the crystals generally referred to as plates as well as those generally referred to as fibers or filaments. Similar generally dipyramidal-shaped particles are illustrated in FIG. 1 of U.S. Pat. No. 5,024,982.

By selecting the proper alcohol, solvent, ratios of alcohol to magnesium chloride, and precipitation conditions, it is possible to obtain generally dipyramidal catalyst precursor particles having a desirable particle size for use in the preparation of olefin polymerization catalysts.

Examples of alcohols which the inventors have found to be suitable include n-butanol and n-hexanol.

The particular solvent used to dissolve the combination of the magnesium chloride and the alcohol can readily be determined by routine experimentation. Typically aromatic hydrocarbons having 6 to 8 carbon atoms are preferred. Some typical examples include toluene, and the xylenes. While it is possible to use ortho-, meta-, or para-xylene, it is also possible to use mixed xylenes.

It is generally preferred that the magnesium chloride be employed in a very fine state which will assist in the formation of the solution. In a currently preferred embodiment, the magnesium chloride and the alcohol are combined and subjected to ball milling before being added to the solvent.

While some small amounts of the magnesium dichloride and alcohol may dissolve in the solvent at normal ambient temperatures, typically it is desirable to heat the mixture to a temperature of at least about 100° C. to obtain substantial dissolution of the magnesium dichloride. Typically the mixture is stirred during the dissolving step to assist in the dissolution of the magnesium dichloride.

After the desired solution is obtained, the solution is then cooled to allow the precipitation of the dipyramidal-shaped particles. The particular conditions employed in this cooling step can vary over a wide range depending upon the particular results desired. Typically, however the solution is gradually cooled from a temperature of at least about 100° C. to a temperature in the range of about 15° C. to about 25° C. The speed with which the cooling is conducted can have an effect upon the size and yield of the catalyst precursor particles. It is generally preferred that stirring be discontinued during the cooling step.

The amount of solvent used can vary over a wide range. Typically, however, the weight ratio of the magnesium chloride to the solvent would be in the range of about 1/10 to about 1/1000, more preferably about 1/30 to about 1/180.

While it is within the scope of the present invention to include in the magnesium chloride/alcohol solution certain additives such as electron donors which are known to provide improvements in stereoselectivity in olefin polymerizations, the format on of the crystals is carried out in the absence of particulate oxide diluents such as alumina, silica, silicalite, titania, zirconium phosphate, and silica-alumina.

Examples of electron donors which can be employed as additional adjuvents in the initial solution include phenols and esters. Currently preferred phenols include the compound known as phenol and the compound known as 4-phenyl-phenol. Typical esters include ethylbenzoate and ethyltoluate. Other examples of suitable electron donors are disclosed in U.S. Pat. No. 4,394,291.

As an alternative to using an admixture of magnesium chloride and alcohol, it is also possible within the scope of the present invention to add a transition metal tetraalkoxide and water to the solvent in such a manner that the transition metal tetraalkoxide and the water react to product the desired alcohol in the desired amount. Typical suitable transition metal tetraalkyloxides include those of zirconium, titanium, and. vanadium. The currently preferred tetraalkyloxides are the titanium tetraalkoxides in which the alkyl portion of the alkoxy groups are straight chain alkyl radicals having 4 to 6 carbon atoms. Particular currently favored examples include titanium tetra n-butoxide and titanium tetra n-hexyloxide.

The amount of water employed can vary depending upon the particular results desired and the particular titanium alkoxide being employed. As a general rule, the molar amount of water employed is not significantly greater than the molar amount of magnesium employed. The molar ratio of the transition metal compound to the metal halide compound can also vary over a relatively broad range. Generally, that molar ratio is within the range of about 10:1 to about 1:10, more commonly in the range of about 2:1 to about 1:2. The currently preferred technique involves using a titanium tetraalkoxide and magnesium dichloride at a molar ratio of about 1:2 and a magnesium to water molar ratio of about 1:1.

The conditions employed in forming the solution can vary. Typically however, it is desirable to heat the admixture of the alcohol and the magnesium dichloride in the solvent to a temperature of at least about 100° C. to obtain optimum dissolution. It is generally desirable to stir the mixture during this process. The heating can be carried out for any convenient time period. Typically, it is desirable to have the solution held at a temperature of at least about 100° C. for at least 30 minutes, and preferably for more than one hour.

After the heated solution has been obtained, then the solution is allowed to gradually cool to form the desired precipitate. Generally it is desirable not to employ stirring during this cooling process. The rate of cooling can vary over a wide range depending upon the particular results desired. Typically, however, it is desirable for the cooling to be done at a rate of about 5° C. per hour to about 100° C. per hour. It is typically desirable to cool the heated solution to normal ambient room temperature, i,e, about 15° C. to about 25° C.

The resulting precipitate can be isolated from the liquid by decanting the liquid or filtering or other known techniques. In some cases it is desirable to wash the resulting precipitate before it is used to prepare an olefin polymerization catalyst. Typically any liquids can be used for the washing process which do not have a significant effect upon the morphology of the precipitate particles. As a general rule it has been found that washing with alkane liquids is preferable to washing with aromatic liquids.

The generally dipyramidal shaped magnesium-containing particles can be used to form olefin polymerization catalysts in a wide range of techniques. The simplest involves merely contacting the particles with a suitable transition metal compound to result in a catalyst which can be employed with a typical reducing agent type cocatalyst of the type known in the art for use in polymerizing olefins.

A currently preferred process for preparing a catalyst from the alcohol magnesium precipitate involves contacting the precipitate with an alkylaluminum halide and subsequently contacting that resulting product with a transition metal compound, especially titanium tetrachloride. An especially preferred embodiment of that catalyst preparation involves contacting the precipitate first with the alkylaluminum halide and then with silicon tetrachloride and then with titanium tetrachloride. A still more preferred process involves employing the titanium tetrachloride in conjunction with chlorobenzene.

The organoaluminum halide is selected from compounds having the general formula $AlR_nX_{3-n}$ wherein each R is individually selected from saturated and unsaturated hydrocarbyl radicals containing 1 to 20 carbon atoms per radical, X is a halogen and n is any number such that $1 \leq n \leq 2$. Typical examples include methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, triethylaluminum, dicyclohexylaluminum bromide, dieicosylaluminum chloride, methylaluminum sesquibromide, ethylaluminum sesquichloride, ethylaluminum sesquiiodide, and the like, and mixtures thereof. Ethylaluminum sesquichloride, ethylaluminum dichloride, and diethylaluminum chloride have been employed with good results and are preferred. The most preferred organoaluminum halides are ethylaluminum sesquichloride and diethylaluminum chloride.

The temperature employed while mixing the precipitate and the organoaluminum halide as above described can be selected over a broad range. Generally the temperature employed is within a range of about 0° C. to about 100° C. or higher, however temperatures within the range of about 100° C. to about 120° C. are currently favored. Since heat may be evolved when the first catalyst component and the second catalyst component are mixed, the mixing rate is adjusted as required and additional cooling is employed if necessary in order to maintain a relatively constant mixing temperature. After completing the mixing, the resulting slurry is preferably stirred or agitated for a sufficient time, generally within a range of about 15 minutes to about 5 hours to insure that mixing of the components is complete. Thereafter, stirring is discontinued and the solid product recovered by filtration, decantation, and the like. The product can be washed with a suitable material such as a hydrocarbon, e.g., n-pentane, n-heptane, cyclohexane, toluene, xylenes and tile like, to remove any soluble material which may be present. The product is reactive and if it is to be stored before use, it must be protected against unwanted reactions and contamination of the catalyst preparation; this requirement is easily met by one possessing ordinary skill in the art.

The molar ratio of the first solid catalyst component to the organoaluminum halide can be selected over a relatively broad range. Generally, the molar ratio of the magnesium of the first catalyst component to the organoaluminum halide is within a range of 10:1 to 1:10, and more preferably within a range of about 2:1 to about 1:3 since a molar ratio within the latter range usually produces an especially active olefin polymerization catalyst.

In accordance with one embodiment of this invention, the first catalyst component resulting from the reaction of the dihalide-alcohol adduct and the organoaluminum halide is reacted with a halide ion exchanging source comprising a halogen-containing compound of Groups IVA and VA.

The particularly preferred halide ion exchanging compounds of Groups IVA and VA are chlorine-containing compounds of Si, Ge, Sn, P, and C. Typical examples include $COCl_2$, $PCL_2$, $SiCl_4$, $SnCl_4$, $CCL_4$, and acid chlorides of the formula R'COCl where R' is an aliphatic or aromatic radical, preferably containing 1 to 20 carbon atoms.

Other halogen-containing compounds suitable in this embodiment include chlorosiloxanes of the formula $Si_nO_nCl_{2n+2}$ wherein n is a number in the range of 2 to 7, for example $Si_2OCl_6$; chlorinated polysilanes having the formula $Si_nCl_{2n+}$ where n is a number in the range of 2 to 6, such as $Si_4Cl_{10}$; chlorinated silanes having the formula $SiH_{4-n}Cl_n$ wherein n is a number in the range of 1 to 3, such as $SiHCl_3$; silanes having the formula $R'SiH_xCl_y$ wherein R' is an aromatic or aliphatic radical containing 1 to 20 carbon atoms, x a number in the range of 0 to 2, and y is a number in the range of 1 to 3, such as $C_2H_5SiCl_3$, $CH_3SiCl_2H$, and $(CH_3)_2SiCl_2$; alkoxy-halogensilanes of the formula $Si(OR)_{4-n}Cl_n$ wherein R is an alkyl or aryl radical having 1 to 20 carbon atoms and n is a number in the range of 1 to 3, such as $Si(OC_2H_5)Cl_3$.

In a particularly preferred embodiment, a chlorine-containing silicon compound or an organosilane is employed in combination with $TiCl_4$. Examples of the preferred silicon compounds for this embodiment include $SiCl_4$, $HSiCl_3$, $ØSiHCl_2$ and $ØSiCl_3$, wherein Ø is a phenyl radical. In this embodiment, the ratio of silicon compound to $TiCl_4$ can vary considerably, generally however, best results are obtained if the molar ratio of silicon compound to $TiCl_4$ in the range of about 1/1.

Generally the reaction of the first catalyst component with the halogen containing source can be carried out neat or in a suitable liquid medium in which the halide ion exchanging source is soluble. Chlorobenzene is particularly preferred.

The temperature employed in the reaction of the first catalyst component and halide ion exchanging source can be selected over a relatively broad range, generally in the range of −25° C. to +250° C., preferably 0° C. to 200° C., with a temperature of about 100° C. being most preferred.

The treating time can also be selected over a broad range and generally is within the range of about 10 minutes to about 10 hours. While the weight ratio of the halide ion exchanging source to the first catalyst component can be selected over a relatively broad range, the weight ratio of the halide ion exchanging source to the first catalyst component is generally within a range of about 10:1 to about 1:10 and more generally from about 7:1 to about 1:4. Following the treatment of the first catalyst component with the halide ion exchanging source, the surplus halide ion exchanging source is removed by washing the solid catalyst with a dry (essential absence of water) liquid such as a hydrocarbon of the type previously discussed, n-hexane, or xylene for example. The resulting catalyst can be stored in the diluent, or after drying, stored under dry nitrogen.

While it may not be necessary in all instances to employ a cocatalyst with the catalyst of the present invention, the use of cocatalysts is recommended for best results. The organometallic cocatalysts suitable for use in accordance with the invention can be selected from among the hydrides and organometallic compounds of metals of Groups IA, II, and IIIA of the Periodic Table. Of the organometallic cocatalysts, organoaluminum compounds are preferred with the most preferred organoaluminum cocatalysts being compounds of the formula $R_3Al$ which include, for example, trimethylaluminum, triethylaluminum, triisopropylaluminum, tridecylaluminum, triecosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The molar ratio of the organometallic compounds of the cocatalyst to the transition metal compound of the first catalyst component is not particularly critical and can be selected over a relatively broad range. Generally, the molar ratio of the organometallic compounds of the cocatalyst to the transition metal compound of the first catalyst component is within a range of about 1:1 to about 1500:1. For catalyst systems wherein the cocatalyst comprises at least one organoaluminum compound typically there is employed about 0.25 to 15 milligrams of the titanium-containing component per mmole of organoaluminum cocatalyst.

Generally in the polymerization of propylene or higher alpha olefins it has also been found desirable to include a stereospecific cocatalyst modifier when a trialkyl aluminum is employed as the cocatalyst. Examples of such include compounds such as amines, amides, ethers, esters, ketones, arsines, phosphoramides, thioethers, aldehydes, alcoholates, silanes, amides, and salts of organic acids of metals of the first four groups of the Periodic Table. Lewis bases that are often employed include aromatic esters or amines. Typical examples of aromatic esters are ethyl benzoate, ethyl p-methoxybenzoate (ethyl anisate), ethyl o-chlorobenzoate, ethyl naphthenate, ethyl toluate, and ethyl p-butoxybenzoate. A suitable amine is 2,2,6,6-tetramethylpiperidine. Generally the Lewis base:aluminum alkyl ratio is lower than 0.8:1, in the case of an aromatic ester or amine, the preferred ratio is from 0.1:1 to 0.6:1. The catalyst activity and stereospecificity seem to be related to the Lewis base:aluminum alkyl molar ratio. Dialkyloxy silanes are also suitable cocatalyst modifiers. Such can be used either alone or in combination with another Lewis base. A particularly preferred modifier is diphenyldimethoxysilane. Typically the molar ratio of silane to aluminum alkyl is in the range of about 0.002/1 to about 0.5/1.

A variety of polymerizable compounds are suitable for use in the process of the present invention. Olefins which can be homopolymerized or copolymerized with the invention catalysts include aliphatic mono-olefins. While the invention would appear to be suitable for use with any aliphatic mono-1-olefin, those olefins having 2 to 20 carbon atoms are most often used. The mono-1-olefins can be polymerized according to the present invention employing either a particle form process, a gas phase process, or a solution form process. Aliphatic mono-1-olefins can be copolymerized with other 1-olefins and/or with other smaller amounts of other such as 1,3-butadiene, isoprene, 1,3-pentadiene, styrene, alpha-methylstyrene, and similar ethylenically unsaturated monomers which do not impair the catalyst.

Polymerization may be conducted in a liquid phase, in liquid monomer in the presence or absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline, and the like. Generally for propylene or 4-methylpentene particle form polymerization the liquid monomer is used as the diluent.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be added to the reactor first or they can be charged simultaneously through an entry port under an isobutane purge. After closing the entry port, hydrogen; if used, is added, and then a diluent such as isobutane is added to the reactor. The reactor is heated to the desired reaction temperature, which for polymerizing ethylene, for example, is, for best results, generally within a range of about 50° C. to about 115° C. and the monomer is then admitted and maintained at a partial pressure within a range of about 0.5 MPa to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, including modifier, if used, polymerizable compounds, and hydrogen, if any, and in any desirable order. The reactor product is continuously or periodically withdrawn and the polymer recovered as appropriate, generally by flashing the diluent (solvent) and unreacted monomers and drying the resulting polymer.

For optimum productivity of polymer of low solubility in the continuous polymerization of propylene, it is preferable to contact the cocatalyst comprising the trialkylaluminum-Lewis Base with the titanium-containing catalyst for a short period immediately prior to its being exposed to liquid propylene. It is preferable under these circumstances that the molar ratio of trialkylaluminum to Lewis base in the cocatalyst be greater than 2:1, generally 3–4:1. Such pre-contacting is generally not needed when a silane cocatalyst modifier is used instead of a Lewis base.

The olefin polymers made with the catalysts of this invention are useful in preparing articles by conventional polyolefin processing techniques such as injection molding, rotational molding, extrusion of film, and-the like.

A further understanding of the present invention and its advantages will be provided by the following examples illustrating a few embodiments of the invention.

EXAMPLE I

A series of experiments were conducted by forming solutions of various alcohols and magnesium chloride in xylene and then cooling the resulting solution to obtain precipitates. It was observed that secondary alcohols and phenols cause swelling of the magnesium chloride without dissolution in the xylene even when alcohol to magnesium ratios as high as 6:1 are used. It was found, however, that straight chain or isoalcohols can dissolve magnesium chloride and yield crystals having various shapes. A summary of the alcohol to magnesium ratios in the solution and the type of precipitates observed is set forth in Table I.

TABLE I

| Alcohol | ROH/Mg | Crystal Shape |
| --- | --- | --- |
| Ethanol | 2 | hexagonal plates |
| n-Propanol | 2 | needles |
| n-Propanol | 4 | trapezoidal plates |
| n-Butanol | 2 | dipyramidal |
| n-Butanol | 4 | needles |
| i-Amyl | 2 | needles |
| n-Hexanol | 2 | round lumps |
| n-Hexanol | 3 | dipyramidal |

While Table I shows that various types of particles were obtained, clearly the more compact and desirable shapes for use in forming polymerization catalyst were the dipyramidal shapes formed using n-butanol and n-hexanol.

EXAMPLE II

Preparation of Dipyramidal Catalyst Precursor Particles

After ball milling, 5.70 grams of anhydrous magnesium chloride was suspended in 450 milliliters of mixed xylenes. While stirring, 11 milliliters of n-butanol was added. The slurry was heated to 125° C. for 20 hours. While all of the solid did not dissolve, the heating and stirring were stopped and the mixture was allowed to cool overnight in an oil bath. The yield of solid was 14.16 grams. The solid particles were examined with microscope and it was observed that a substantial yield of generally dipyramidal shaped solid particles had been obtained. This solid precipitate will be referred to herein as catalyst precursor A.

EXAMPLE III

Another attempt to obtain particles was carried out in this case using more n-butanol relative to the magnesium chloride. Here 5.7 grams of ball milled magnesium chloride was suspended in 450 milliliters of mixed xylenes and then 22 milliliters of n-butanol was added. The resulting slurry was heated to 125° C. for 6 hours. It was observed that more of the magnesium dichloride had dissolved by this time than had in the previous preparation but still not all of the solid was dissolved. The solution was then allowed to cool to room temperature overnight. A yield of 16.8 grams of solid was filtered off and dried. The solid was examined under a microscope and it was noted that the particles were needle-like crystals rather than dipyramidal type crystals. This resulting precipitate will be referred to herein as catalyst precursor B.

EXAMPLE IV

Catalyst Preparations

Catalysts were prepared from the two precursors of Examples II and III. The catalyst preparation involved suspending 2 grams of the catalyst precursor in 40 milliliters of cyclohexane. Then 10 milliliters of 25 weight percent solution of diethylaluminum chloride in heptane was added to the suspension. The slurry was then heated to 100° C. for 2 hours. After cooling, the supernatant liquid was decanted off and the solid was washed with 40 milliliters of cyclohexane. The solid was then combined with 20 milliliters of titanium tetrachloride and the resulting slurry was hated to 100° C. for 2 hours to yield violet solids in both cases. The solids were filtered off in a glove box, washed with heptane and dried. The yield obtained with catalyst precursor A was 1.2 grams and the yield obtained with catalyst precursor B was 0.82 grams. The resulting catalysts were examined under a microscope and it was observed that generally dipyramidal catalyst particles resulted from the precursor A whereas generally needle-shaped catalyst particles resulted from precursor B.

Both of these catalysts were then individually evaluated as propylene polymerization catalysts. The polymerization conditions employed involved using propylene as the diluent and trimethylaluminum as the cocatalyst along with diphenyldimethoxysilane, as cocatalyt modifier.

Both catalysts were active in producing polypropylene. In each case, the resulting polymer particles were examined under a microscope. The polymer particles in each case had a morphology similar to that of the respective catalyst. The polymer resulting from precursor A produced polymer particles having generally a dipyramidal shape. In contrast, the catalyst produced by precursor B yielded polypropylene particles having generally needle-shaped morphology. The catalyst prepared from precursor A will be referred to herein as catalyst A. The catalyst prepared from precursor B will be referred to as catalyst B.

EXAMPLE V

Another catalyst was prepared by suspending 2 grams of catalyst precursor A in 75 milliliters of mixed xylenes. Then 3 milliliters of a 25 weight percent solution of diethylaluminum chloride in heptane was added. The resulting slurry was then heated to 100° C. for about 5 hours. The resulting slurry was allowed to cool overnight and the solids were removed by filtering. The recovered solids were then washed with heptane. The resulting solid was then suspended in 20 milliliters of silicon tetrachloride and heated to 100° C. for 1 hour and then filtered off and washed with heptane again. The white solid was then suspended in a mixture of 20 milliliters of chlorobenzene and 20 milliliters of titanium tetrachloride and heated to 100° C. for 1 hour. The mixture was cooled and the resulting solid was filtered off, washed with heptane and dried. The resulting catalyst will be referred to herein as catalyst C.

Catalyst C was evaluated for its effectiveness in the polymerization of 4-methylpentene-1. The polymerization was carried out as 50° C. by first weighing 1,300 grams of 4-methylpentene-1 into the reactor. Then 8.4 milliliters of a 15 weight percent solution of triethylaluminum in heptane was added. Then the catalyst C was added in an amount of about 0.1 grams. In some runs a diphenyldimethoxysilane cocatalyst modifier was also then added. The cocatalyst modifier was employed as a 2 milliliter portion of a 0.1 molar solution of diphenyldimethylsiloxane in heptane. Finally, hydrogen was added by controlling the pressure drop in a 325 cc vessel to a desired level, usually 25 psi. The reactor was then heated to about 50° C. in about 5 minutes and held there for 1 hour. Then the reactor was cooled to about 25° C. as the pressure was vented. The liquid portion was siphoned off and evaporated to allow the determination of the amount of soluble polymer in the liquid. The solid polymer was also allowed to dry. The results of four such runs are summarized in Table II.

TABLE II

| Run | M.F. | Silane[a] | Productivity g/g/hr. | % Conv. | % Soluble |
| --- | --- | --- | --- | --- | --- |
| 1 | 42 | — | 12560.4 | 8.79 | 13.08 |
| 2 | 41 | Y | 8955.0 | 7.65 | 7.39 |
| 3 | 32 | — | 11434.0 | 9.32 | 12.40 |
| 4 | 48 | Y | 8901.6 | 8.35 | 7.31 |

[a]Y indicates that diphenyldimethoxysilane was used in cocatalyst system.

Identical bulk polymerizations of 4-methylpentene-1 were carried out using catalysts A and B. The data in Table II shows that for catalyst C the silane modifier reduced the productivity somewhat but also reduced the amount of soluble polymer formed. The same was observed in the polymerization runs using catalyst A and B. The results of the polymerizations revealed that catalyst C is more active than catalyst A or B. Also, the percent soluble polymer produced was much lower for catalyst C than for catalyst A and B, which generally yielded % solubles in the range of about 25 to about 54 weight percent. Catalyst C is particularly surprising in that it gives even lower amounts of soluble polymer than one obtained using a catalyst of the type disclosed in U.S. Pat. No. 4,394,291 even though catalyst C has none of the internal electron donor type modifiers that the '291 patent teaches as being useful for reducing the formation of soluble polymer. The catalyst C also produced polymer particles having a more desirable morphology than the polymer particles resulting from catalyst of the type disclosed in the '291 patent.

EXAMPLE VI

Still another catalyst was prepared by suspending 0.95 grams of anhydrous magnesium chloride in 75 milliliters of mixed xylenes. Then 0.18 milliliters of water was added to the slurry and the slurry was stirred for 2 days. The mixture was then transferred to a glove box and 0.47 grams of phenol was added. Then 1.7 milliliters of titanium n-butoxide was added to the slurry and the slurry was heated in an oil bath to 120° C. for 1 hour. The heat was then turned off and the slurry was allowed to cool overnight to room temperature of about 25° C. An off-white particulate solid in the amount of 1.58 grams was obtained. A substantial yield of dipyramidal-shaped particles were obtained. These particles were generally of the same shape observed when one prepared a catalyst by precipitating a solution of Ti(OBu)$_4$ and MgCl$_2$ in the presence of silica as taught in U.S. Pat. No. 5,024,982.

EXAMPLE VII

In this case, 5.7 grams of ground magnesium chloride was slurried in 450 milliliters of mixed xylenes and 1.08 milliliters of water was added followed by stirring for 2 days. Then 10.3 milliliters of titanium n-butoxide was added and the slurry was heated to 120° C. and stirred for 6 hours. The heat to the oil bath and the stirring were then stopped and the mixture was allowed to cool slowly overnight. The solid was filtered off and suspended in 450 milliliters of mixed xylenes. Then 18 milliliters of a 25 weight percent solution of diethylaluminum chloride in heptane was added and the mixture was heated to 100° C. for 5 hours. After cooling overnight, the solid was filtered off and washed with heptane. The solid was then suspended in 250 milliliters of silicon tetrachloride and heated to 100° C. for 1 hour. The solid was then filtered off and washed with heptane. The resulting white solid was then suspended in a mixture containing 200 milliliters of chlorobenzene and 200 milliliters of titanium tetrachloride and heated to 100° C. for 1 hour. Finally, the solid was filtered off in a glove box, washed with heptane, and dried. The yield of catalyst was 6.44 g. This catalyst was then used in the bulk polymerization of 4-methylpentene-1 using the same polymerization conditions as set forth in Example V. The polymerization variables and results are summarized in Table III.

TABLE III

| Run | M.F. | Silane[a] | Productivity g/g/hr. | % Conv. | % Soluble |
|---|---|---|---|---|---|
| 5 | 27 | — | 14156.1 | 22.32 | 11.37 |
| 6 | 26 | Y | 12256.2 | 11.41 | 6.72 |
| 7 | 33 | — | 14804.9 | 14.01 | 18.16 |

[a]Y indicates that diphenyldimethoxysilane was used in cocatalyst system.

The data illustrate that the catalyst had a high activity for the polymerization of 4-methylpentene-1 and that the activity and solubles were both similar to what was obtained with catalyst C.

EXAMPLE VIII

A series of five catalysts were prepared under identical conditions. All the catalysts were prepared in glass reaction vessels that were specially designed to preclude leaks of gaseous or volatile liquid components.

Each catalyst preparation involved first adding 9.5 grams of anhydrous magnesium chloride, and 18.2 milliliters of n-butanol to a 250 milliliter steel vessel containing 400 grams of ⅜-inch steel balls. A slightly exothermic reaction occurred. After removing this steel vessel from the glove box, the vessel was placed on a vibratory mill with a frequency of 1,760 cycles per minute and an amplitude of ⅜-inch. The milling was carried out for 18 hours. A 2 gram portion of the resulting ball-milled mixture was then suspended in 70 milliliters of mixed xylenes in the catalyst preparation vessel and heated to 120° C. for 20 hours. The mixture was then allowed to cool overnight and the particulate solid containing dipyramidal particles was filtered off in a glove box. The wet solid was returned to the special catalyst preparation vessel and suspended in 75 milliliters of mixed xylenes. Then 3 milliliters of a 25 weight percent solution of diethylaluminum chloride in heptane was added while the mixture was stirred. The resulting slurry was heated to 100° C. for 5 hours and then cooled overnight. The resulting catalyst precursor was filtered off in a glove box and washed with heptane. The resulting precursor from the DEAC treatment was then suspended in 33 milliliters of chlorobenzene and 33 milliliters of titanium tetrachloride was added. The resulting slurry was well mixed by shaking and then was heated to 100° C. for 1 hour. The resulting solid was filtered off in a glove box and washed with chlorobenzene and heptane and dried to yield the polymerization catalyst.

Two samples of each of the five catalyst preparations were evaluated for the polymerization of 4-methylpentene-1. Thus, a total of 10 separate polymerization reactions were carried out. The polymerizations were carried out at 50° C. by first weighing 1,300 grams of 4-methylpentene-1 into the polymerization reactor. Then 8.4 milliliters of a 15 weight percent solution of triethylaluminum in heptane was added and then the catalyst was added. Hydrogen was added by controlling pressure drop in a vessel to a desired level, usually 25 psi. The reactor was heated to 50° C. in about 5 minutes and held there for 1 hour. The reactor was then cooled to about 25° C. as the pressure was vented. The liquid portion was siphoned off and the liquid evaporated to allow one to determine the amount of soluble polymer. The solid polymer was also allowed to dry. The average productivity in grams of polymer per gram of catalyst per hour was 20,040. The average monomer solubles was 20.04 for the worst of the two catalyst runs. The average for all ten runs was 18.07.

EXAMPLE IX

Portions of the catalysts prepared as set forth in Example VIII were also evaluated for the polymerization of ethylene. For comparison, ethylene polymerization runs were also conducted under the same conditions using a control prepolymerized, precipitated titanium catalyst prepared using the general procedure described in U.S. Pat. No. 4,325,837, namely MgCl$_2$ and a titanium alkoxide were combined in a diluent to form a solution, the solution was contacted with an alkyl aluminum halide to produce a solid which was prepolymerized and then contacted with TiCl$_4$. This control catalyst is known to be sufficiently active to be commercially viable in a commercial scale process for the polymerization of ethylene.

The polymerizations were carried out by polymerizing ethylene in isobutane under a hydrogen partial pressure using triethylaluminum as the cocatalyst. The hydrogen was added in the same manner as previously described for the 4-methylpentene polymerization, i.e. the hydrogen was added by allowing a certain pressure drop from a supply vessel, in this case a 158 psi drop. The catalyst of Example VIII had productivity in the range of about 7,000 to about 9,000 grams of polymer per gram of catalyst per hour. This was comparable to the control catalyst wherein two comparable runs gave productivities in the range of 6,000 to 7,000 grams of polymer per gram of catalyst per hour. The control catalyst gives yields comparable to those obtained in current commercial particle-form polymerizations.

That which is claimed is:

1. A process for producing magnesium-containing dipyramidal-shaped crystals useful as supports for olefin polymerization catalysts, said crystals having a length which is no more than about four times the width of the largest dimension transverse to the axis of the length of the particle, said process comprising combining magnesium dichloride and an alcohol selected from n-butanol and n-hexanol in a solvent consisting essentially of an aromatic solvent selected from toluene and xylenes, heating the mixture to a temperature of at least 100° C. to obtain a solution of magnesium dichloride, and then gradually cooling the solution to a temperature in the range of 15° C. to 25° C. to cause said crystals to form, further characterized by the fact that if the alcohol is n-hexanol, the molar ratio of the n-hexanol to magnesium dichloride is about 3 and if the alcohol is n-butanol, the molar ratio of the n-butanol to magnesium dichloride is about 2.

2. A process according to claim 1 wherein said aromatic solvent is selected from xylenes.

3. A process according to claim 2 wherein the magnesium dichloride, alcohol, and aromatic solvent are heated to a temperature of at least about 125° C. to obtain a solution of magnesium dichloride.

4. A process according to claim 3 wherein said alcohol is n-butanol.

5. A process according to claim 3 wherein said alcohol is n-hexanol.

* * * * *